United States Patent Office 3,301,779
Patented Jan. 31, 1967

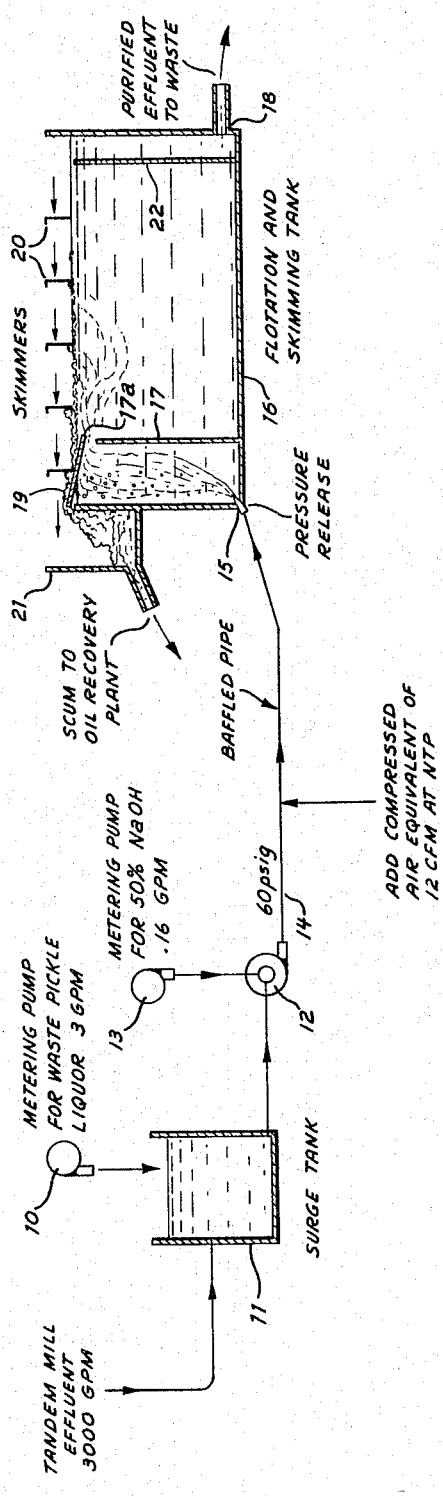

3,301,779
PROCESS FOR TREATING COLD ROLLING MILL EFFLUENT CONTAINING OIL EMULSIFIED IN WATER
Geza Louis Kovacs, Toronto, Ontario, Canada, assignor, by mesne assignments, to New Canadian Processes Limited, Toronto, Ontario, Canada
Filed Jan. 22, 1965, Ser. No. 427,418
1 Claim. (Cl. 210—44)

This invention relates to a process for handling and treating the oil-bearing cooling water from industrial plants such as cold rolling mills with a view to separating the oil and water in such a manner that the oil is suitable for further processing into re-usable or saleable form rather than fit only for disposal, and the water is in an acceptable state for discharging into adjacent sewers or water courses.

In the process of cold rolling steel strip to light gauges, palm oil is often employed as an aid in rolling. Other natural oils, animal fats and artificially compounded oil mixtures are also employed, especially in the rolling of heavier gauges. Some mills use the oils undiluted and apply it with sprays, others spray a mixture or emulsion of water and oil. Some mills use recirculating systems where a large quantity of the oil/water emulsion is flooding the work; in others a smaller quantity of oil is applied on the strip or on the rolls to be used only once, then discarded.

According to conventional practice, the effluent cooling liquid in the rolling process, containing spent rolling oil, cooling water, iron and impurities, is allowed to settle in sumps, pits or settling tanks. A black coloured semi-solid scum is skimmed off, heated in settling tanks, allowed to stand for periods ranging up to several months to remove water, dried by evaporating the remaining water, and sold as a by-product known, if it originated from pure palm oil, as "Refuse Palm Oil." From the bottom of settling sumps or tanks a heavy sedimentary solid layer containing considerable quantities of oil is cleaned out periodically and discarded as waste. These sludges and scums usually contain considerable amounts of finely abraded iron from the rolling process.

The watery portion remaining after the removal of these scums and sludges, which is the bulk of the effluent, is usually handled in one of the following ways:

(a) Directly discharged untreated
(b) Further settled in skimming tanks prior to discharge
(c) Lime treated and clarified, prior to discharge The practice of discharging the watery portion directly to waste is still practised extensively.

As stream pollution has become worse, the purity requirements for bulk liquid discharging have risen correspondingly. As a result, the practice of further settling the watery portion of the effluent in skimming tanks prior to discharge is now used in many places. Because the settling and skimming equipment necessary requires considerable investment, attempts have been made to offset some of the costs involved by re-using the recovered oil. However, failure of the recovered oil to function satisfactorily has discouraged further development in this direction.

In some areas, a high degree of stream pollution control is imperative, and several processes have been developed to treat the watery portion of the effluent which have satisfactorily met these high standards. Such processes, however, are costly to operate and consume considerable space and chemicals. They further result in the rolling oil being recovered in a form which has so far precluded all possibility of re-use or sale as a by-product. Thus, no economy is available to offset the depollution costs, and the recovered oils themselves become a disposal problem.

Canadian Patent No. 597,986, "Process for Recovering Rolling Oil," issued May 17, 1960 to L. Kovacs, describes a process which has been in use at a number of plants whereby the fresh sludges removed from the effluent may be rendered into re-useable rolling oils. However, the water from which these sludges are removed still is not satisfactory for immediate discharge, because the standards set by government pollution control agencies (usually less than 15 p.p.m. oil) are not met.

Unlike any of the above approaches to the problem, this invention consists of a method for treating the fresh effluent immediately, rather than permitting the effluents to stand in settling tanks so that scums and sludges may be formed.

The object of this invention is to provide a process for treating the effluent cooling liquid from the rolling operation, with two other waste materials available from the mill which results in the recovery of the rolling oil in a form suitable for further treatment, for example by the process taught in Canadian Patent 597,986, and which results in water containing less than 15 parts per million oil, thus meeting the anti-pollution requirements.

The process according to this invention involves forming in the effluent cooling liquid an insoluble precipitate which coagulates and concentrates the oil, placing the total effluent under pressure and dissolving pressurized air therein, releasing the pressure on the effluent liquid so that the air returns to the gaseous state and removes the coagulum and thus the oil upwardly by flotation, and skimming off the resultant layer of scum. By "insoluble precipitate" is meant a material which is insoluble in the effluent cooling liquid. It is mandatory that this material be capable of dissolution in some subsequent process for oil recovery.

The accompanying drawing shows a flow-diagram illustrating the several steps in the method according to the invention.

In the following description, the above steps are dealt with in the order of their execution.

The precipitate with which we are here dealing is that formed by mixing an alkaline waste referred to as washer effluent with an acid waste known as pickle liquor. In steel mills there are "cleaning lines" which are alkaline washers for steel strip which produce the alkaline waste used in this process. The alkaline waste usually contains free caustic soda, soap, and oil in an emulsified form which will not settle. This material is herein referred to as washer effluent.

Waste pickle liquor, which is usually available in all steel mills and which normally constitutes a disposal problem is the second waste used to treat the rolling mill effluent. Waste pickle liquor consists primarily of sulphuric acid ($H_2SO_4$) and ferrous sulphate ($FeSO_4$).

It is important to form the precipitate in situ, that is, the first waste should be fully dispersed in the mill effluent before the second is added, in order to insure the scrubbing out of as much oil as possible.

Either the washer effluent or the waste pickle liquor may be the first to be added to the effluent, and usually the choice of the one over the other results in little practical difference. However, it is advisable to avoid having the pH of the mixture remain in the neutral or alkaline range for any length of time, because the oil content of the effluent tends in such circumstances to become saponified. This problem is avoided if the pH of the effluent is in the acid range. For this reason the waste pickle liquor is ideal because it contains sulphuric acid which is useful to keep the pH of the final mixture in the acid range.

Accordingly, the waste pickle liquor is metered by a metering pump 10 into a surge tank 11 into which the tandem mill effluent to be purified is fed. The surge tank 11 is violently agitated by the incoming effluent and thereby complete dispersion of the waste pickle liquor throughout the effluent is assured. A pressurizing pump 12 draws the effluent containing the waste pickle liquor out of the surge tank 11 and pressurizes it to within the range of 40–80 p.s.i.g. A second metering pump 13 feeds the washer effluent into the suction of the pressurizing pump 12, and the pressurizing pump 12 effects the complete mixing of both additives in the effluent. On issuing from the pump 12 the effluent should have a pH of 5–6. The cleaning line waste and the pickle liquor combine in the effluent to form an insoluble precipitate which scrubs out substantially all of the oil in the effluent. In the above step it is advisable to avoid cleaning line wastes, or substitutes therefor, which contain silicates because although the water is purified to the necessary degree, the presence of the silicates in the reclaimed oil is detrimental. It should also be pointed out that the use of lime, $Ca(OH)_2$ as a substitute for washer effluent is undesirable due to the deleterious effect it has in later processing and on the quality of the recovery oil.

After mixing the waste pickle liquor and the cleaning line waste in the mill effluent, some indication as to the resultant pH of the effluent can be had from its colour. If the effluent is neutral or alkaline, it retains a yellow-brown colour. If the pH is maintained on the acid side, the effluent is colourless and has a sparkling clear appearance.

Whether the precipitate is formed so as to be voluminous or finely divided, no difference in the final result is noticeable.

The formation of the precipitate in situ has the important advantage of effecting rapid and complete coagulation of the oil since the precipitate when formed is already completely dispersed throughout the effluent, which insures that the scrubbing out of the oil particles will be complete.

The coagulum at this point may either float or sink, the latter case requiring that air be used to float it. Although in the past the air that is normally dissolved in water at atmospheric pressure or dissolved under pressure in a recirculated side stream has, in many processes, been successfully used to give adequate flotation, in the present process this has proven unsatisfactory because the bulk of the coagulum escapes flotation. Thus, this method contemplates that the total effluent be placed under a pressure of from 40 to 80 p.s.i.g., and that pressurized air at the same pressure be admitted thereto so that it can dissolve in the effluent. Dissolving air in less than the total effluent decreases the efficiency of the separation of air from the effluent stream. The pressurized or compressed air is preferably admitted to the effluent while the latter is flowing through a pipe 14 having upper, semi-circular baffles (not shown) which produce great turbulence.

The step of releasing the pressure on the effluent to cause the air to remove the precipitate and thus the oil upwardly by flotation is carried out by releasing the effluent, saturated with air, through a restrictive orifice 15 into one end of an open-top skimming tank 16 exposed to the atmosphere. In the drawing the skimming tank 16 is shown schematically. A vertical baffle 17 within the skimming tank 16 directs the incoming, treated effluent upwardly toward the surface of the effluent in the tank 16. The incoming effluent passes above the baffle 17 and then moves toward a drainage point 18 from which it is discharged to waste. The provision of the baffle 17 tends to prevent mixing and agitation due to the incoming effluent that could interfere with rapid flotation of the floc. It has been found that a skimmed gravity settler, mostly of conventional design, will perform satisfactorily as a skimming tank. A "beach" 17a is located above the baffle 17 and angles upwardly toward the left end wall of the tank 16. A space is left between the beach 17a and the tank 16 through which undissolved air entering the tank can be vented upwardly.

If the coagulum were not present, the air would come out of solution as a fine milky fog which would rise slowly. However, the action of this material is such that the greater part of the air is associated with it when the pressure is released. The coagulum then floats very rapidly and strongly. It has been found that the bulk of it is floated very early in its passage through the skimming tank, and that most of the scum 19 formed will surface in the first one-third of the length of the tank 16. It is thus advantageous to skim off the scum layer in the direction opposite to that of effluent flow in the skimming tank, so that the scum is not dragged the full length of the skimmer.

In the drawing are shown skimming paddles 20 which move slowly in the direction opposite to the direction of effluent flow in the tank. In this way there is afforded an opportunity for particles, which may have been redeposited through agitation by the skimming action, to be floated again.

The paddles 20 drag the scum 19 up over the beach 17a and into a scum collection trough 21 located at the end of the tank 16.

The fact that flotation of the precipitate occurs rapidly after the pressure is released permits high effluent feedrates with satisfactory results.

A further baffle 22 is located at the downstream end of the tank 16, and acts as a weir for regulating the depth of effluent in the tank, so that the effluent level can be maintained at the beach 17a.

*Example I*

This method was applied to the effluent from a 5 stand tandem high speed cold mill, producing cold reduced steel strip of .008″ thickness for tin-plate manufacture.

The effluent contained the following impurities:

800 p.p.m. rolling oil
40 p.p.m. fine iron powder
75 p.p.m. lubricating oils

The balance of the effluent was cooling water used to cool the steel passing through the mill. In addition to the above impurities the effluent contained varying quantities of emulsifying agents, and some emulsification of the oil and iron impurities had likely taken place. The effluent was at an average temperature of 80° F. The effluent was treated as follows:

(1) The total effluent was pumped at 3000 g.p.m. to surge tanks.

(2) A metering pump added to the surge tanks at a rate of 3 g.p.m. waste pickle liquor containing approx. 12% by weight $FeSO_4$ and 8% by weight $H_2SO_4$.

(3) A pressurizing pump drew effluent from the surge tanks and pumped it through a pipeline into a baffled pipe at a pressure of 60 p.s.i.g.

(4) A second metering pump delivered to the suction of the pressurizing pump 6.0 g.p.m. of a washer effluent. Precipitate was formed.

(5) Compressed air was admitted to the baffled pipe at a pressure in excess of 60 p.s.i.g. and a rate of about 12 c.f.m. as measured at Normal Temperature and Pressure (NTP). The effluent became substantially saturated with air.

(6) The air-saturated, precipitate-laden effluent was then released into a settling tank at atmospheric pressure, and the precipitate was floated and removed by skimming.

The skimmed-off material was treated as described in Canadian Patent No. 597,986 "Process for Recovering Rolling Oil" to produce rolling oil which was subsequently re-used.

The effluent from the settling tank had a sparkling, clear, colourless appearance, a pH of 5–6, and an oil content less than 15 p.p.m.

Example II

The method was applied to the effluent from a second tandem mill. The cooling water for the mill was derived from clarified river water. The composition of the effluent was as follows:

600 p.p.m. rolling oil
35 p.p.m. iron powder
76 p.p.m. lubricating oil

The remainder of the effluent was water, and the whole was at an average temperature of 75°. The effluent was treated as follows:

(1) The total effluent was pumped at 3000 g.p.m. to surge tanks.

(2) A metering pump added to the surge tanks at a rate of 3.5 g.p.m. waste pickle liquor containing 8% by weight $FeSO_4$.

(3) A pressurizing pump drew effluent from the surge tanks and pumped it through a pipeline into a baffled pipe at a pressure of 45 p.s.i.g.

(4) A second metering pump delivered to the suction of the pressurizing pump 0.45 g.p.m. of a solution of an alkaline washing compound used in electrolytic washers. Complete mixing was effected by the pressurizing pump and precipitate was formed.

(5) Compressed air was admitted to the baffled pipe at a pressure in excess of 45 p.s.i.g. and at a rate of about 12 c.f.m. as measured at Normal Temperature and Pressure (NTP). The effluent became substantially saturated with air.

(6) The air-saturated, precipitate-laden effluent was then released into a settling tank at atmospheric pressure, and the coagulum was floated and removed by skimming.

The skimmed-off material was treated as described in Canadian Patent No. 597,986 "Process for Recovering Rolling Oil" to produce rolling oil which was subsequently re-used.

The effluent from the settling tank had a sparkling, clear, colourless appearance, a pH of 5–6, and an oil content of less than 15 p.p.m.

What I claim as my invention is:

A process for treating the effluent cooling and lubricating liquid containing oil emulsified in water employed in cold rolling mills, comprising: the steps of adding a quantity of waste pickle liquor derived from the said cold rolling mill; adding a quantity of alkaline washer effluent from steel mills thereby forming in the effluent cooling liquid an insoluble floc to coagulate and concentrate the oil, placing the total effluent under pressure and dissolving pressurized air therein, releasing the pressure on the effluent liquid so that the air returns to the gaseous state and removes the floc and thus the oil upwardly by flotation, and skimming off the resultant layer of floc and oil.

References Cited by the Examiner

UNITED STATES PATENTS

| 2,806,868 | 9/1957 | Kovacs | 260—412.5 |
| 3,015,396 | 1/1962 | Quast | 210—44 X |
| 3,175,687 | 3/1965 | Jones | 210—44 X |
| 3,243,446 | 3/1966 | Funk | 260—412.5 |

OTHER REFERENCES

Haseltine: Character and Treatment of Soluble Oil Wastes, Sewage Works Journal, Sept. 1949, vol. 21, pp. 859–876.

Shideler: Clarification of Oil Contaminated Waters, Proc. of the Ninth Industrial Waste Conf., Purdue Univ., 1954, pp. 239–243.

MORRIS O. WOLK, *Primary Examiner.*

MICHAEL E. ROGERS, *Examiner.*